(12) United States Patent
Stack et al.

(10) Patent No.: US 9,732,506 B2
(45) Date of Patent: Aug. 15, 2017

(54) ANTI-OVERFLOW TOILET WITH DETACHABLE PRIMARY AND SECONDARY DRAIN TUBES

(71) Applicants: Patrick Gerard Stack, Northville, MI (US); Lawrence Allen Trowbridge, Dripping Springs, TX (US)

(72) Inventors: Patrick Gerard Stack, Northville, MI (US); Lawrence Allen Trowbridge, Dripping Springs, TX (US)

( * ) Notice: Subject to any disclaimer, the term of this patent is extended or adjusted under 35 U.S.C. 154(b) by 71 days.

(21) Appl. No.: 14/809,684

(22) Filed: Jul. 27, 2015

(65) Prior Publication Data
US 2016/0024774 A1  Jan. 28, 2016

Related U.S. Application Data

(60) Provisional application No. 62/029,810, filed on Jul. 28, 2014.

(51) Int. Cl.
*E03D 11/00* (2006.01)
*E03D 11/02* (2006.01)

(52) U.S. Cl.
CPC .............. *E03D 11/02* (2013.01); *E03D 11/00* (2013.01); *E03D 2201/30* (2013.01)

(58) Field of Classification Search
CPC ....................................................... E03D 11/02
USPC ................................................... 4/420–420.5
See application file for complete search history.

(56) References Cited

U.S. PATENT DOCUMENTS

| | | | | |
|---|---|---|---|---|
| 2,778,029 A * | 1/1957 | Young | ..................... | E03D 11/00 4/427 |
| 3,262,132 A * | 7/1966 | Mann | ..................... | E03D 11/00 4/427 |
| 3,411,162 A | 11/1968 | Palmer | | |
| 4,028,747 A * | 6/1977 | Newton | .................. | E03D 5/016 4/317 |
| 4,204,285 A * | 5/1980 | Pak | ......................... | E03D 11/00 4/427 |
| 5,153,947 A * | 10/1992 | Markles | .................. | E03D 13/00 285/56 |
| 6,411,162 B2 * | 6/2002 | Minamizak | .......... | G09G 3/3688 330/255 |
| 6,944,892 B1 * | 9/2005 | Giolas | ..................... | E03D 11/00 4/427 |
| 7,302,714 B2 * | 12/2007 | Orcutt | ..................... | E03D 11/00 4/427 |
| 7,383,594 B1 | 6/2008 | Giesken et al. | | |

(Continued)

*Primary Examiner* — Lori Baker
(74) *Attorney, Agent, or Firm* — Vincent Re PLLC

(57) ABSTRACT

A toilet configuration includes a toilet fixture, a detachable primary drain, and a detachable secondary drain. The primary and secondary drains can be assembled together or formed unitarily. The fixture includes a toilet bowl, a primary drain interface at a bottom of the bowl configured to permit liquid to flow from the toilet bowl into a detachable primary drain, and a secondary drain hole. The detachable primary drain fluidly is connected to the primary drain interface and is configured to be fluidly connected to a sewer pipe to discharge the liquid directly into the sewer pipe. A detachable secondary drain fluidly is connected to the secondary drain hole and is configured to be fluidly connected to the sewer pipe to discharge backed up fluid from the toilet fixture directly into the sewer pipe.

15 Claims, 9 Drawing Sheets

(56) References Cited

U.S. PATENT DOCUMENTS

| | | | |
|---|---|---|---|
| 7,757,312 B2* | 7/2010 | Stack | E03D 11/00 4/427 |
| 8,590,068 B2 | 11/2013 | Stack et al. | |
| 8,590,069 B2 | 11/2013 | Stack et al. | |
| 9,057,187 B2* | 6/2015 | Stack | E03D 11/00 |
| 2004/0231039 A1* | 11/2004 | Turkman | E03D 9/05 4/420 |
| 2005/0000005 A1* | 1/2005 | Giesken | E03D 11/00 4/420 |
| 2008/0060122 A1* | 3/2008 | Andreiu | E03D 11/08 4/300 |
| 2015/0299998 A1* | 10/2015 | Stack | E03D 11/13 4/427 |
| 2015/0322660 A1* | 11/2015 | Conrad | E03D 11/13 4/427 |

\* cited by examiner

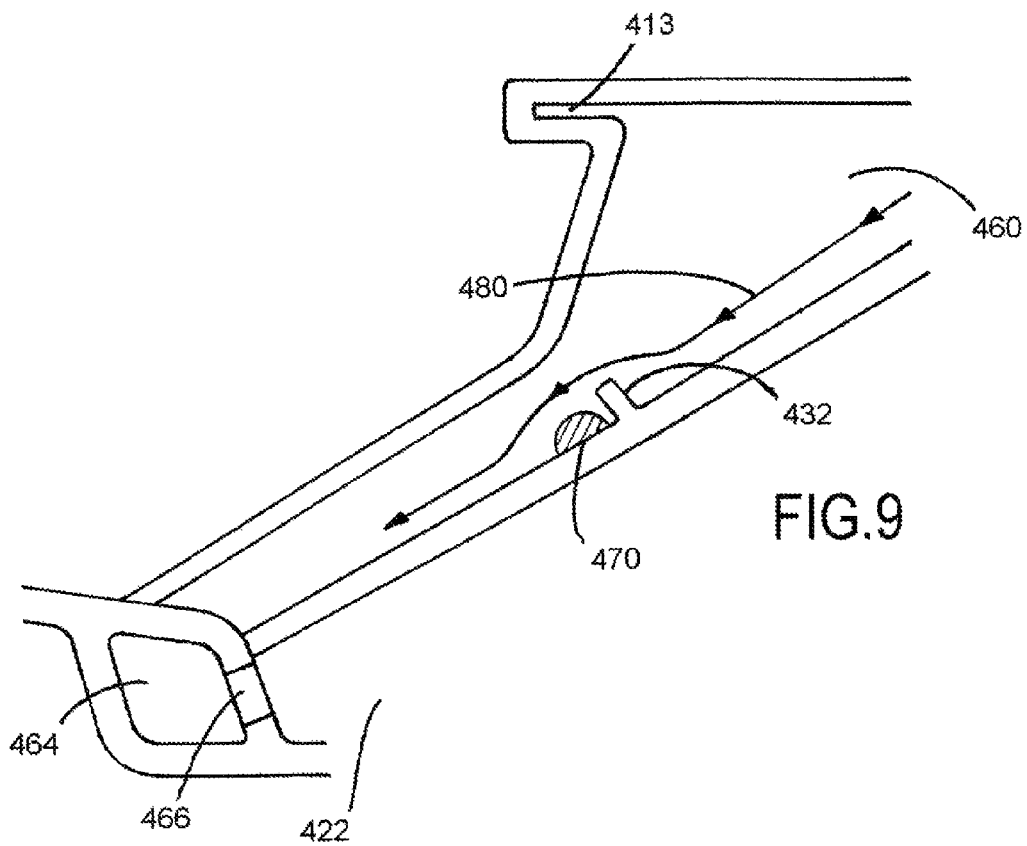
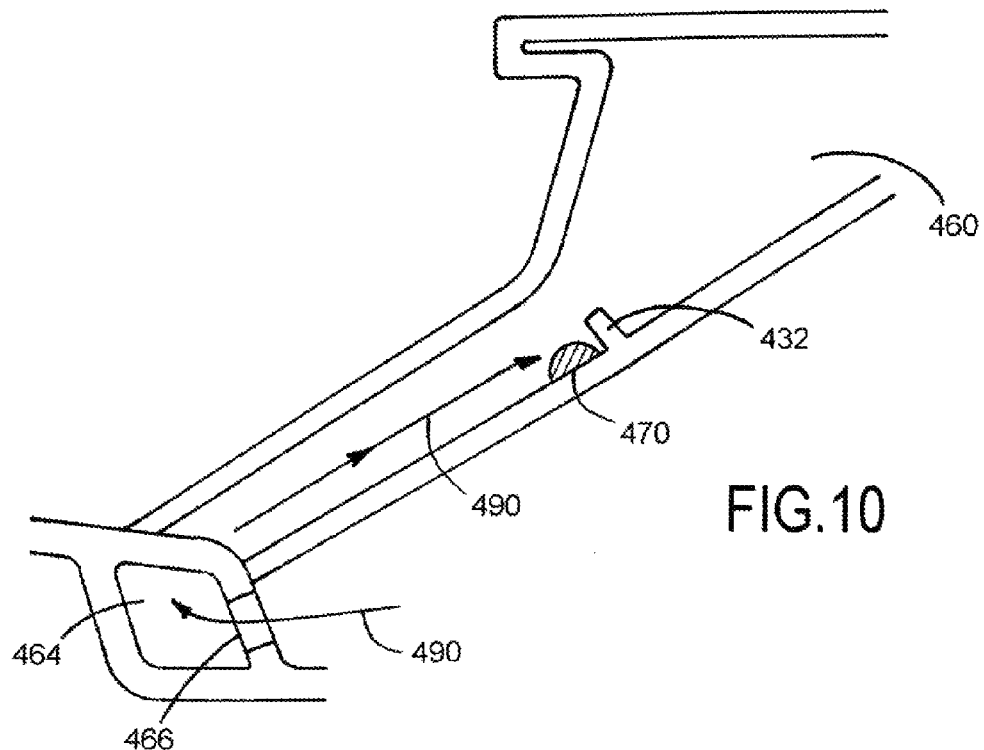

ANTI-OVERFLOW TOILET WITH DETACHABLE PRIMARY AND SECONDARY DRAIN TUBES

CROSS REFERENCE TO RELATED APPLICATIONS

This disclosure claims priority to and the benefit of U.S. Provisional Application No. 62/029,810 filed on Jul. 28, 2014, which is hereby incorporated by reference.

TECHNICAL FIELD

This disclosure relates to an improved bathroom fixture for flushing bodily waste materials into a drainage or sewer system. More particularly, this disclosure includes a toilet having a secondary drainage system that prevents the fixture from overflowing.

BACKGROUND

The statements in this section merely provide background information related to the present disclosure. Accordingly, such statements are not intended to constitute an admission of prior art.

Traditional bathroom fixtures, such as toilets and urinals, may become blocked or plugged-up resulting in the flushing water and waste to overflow when the fixture is flushed. Obviously, this overflow of water and waste materials is undesirable and there is therefore a need for an improved bathroom fixture that prevents these overflows from occurring.

There have been previous attempts to prevent a blocked toilet from overflowing. These prior art anti-overflow devices are often complicated and require modification to existing plumbing within the house or building.

Generally known prior art fails to provide for a simple and cost-effective means for preventing bathroom fixtures from overflowing while being readily installed in place of an existing model toilet or urinal without modification to the plumbing of the building.

Manufacturing of traditional one piece ceramic toilet fixtures is complicated and prone to manufacturing waste. In particular, the primary drain necessarily twists and turns within the fixture. The process of forming this internal twisting cavity within the toilet and then baking the fixture to harden the ceramic material is expensive and prone to manufacturing defects. Significant manufacturing efficiency and reduction in occurrence of mis-formed fixtures can be achieved by manufacturing the primary drain separately from the rest of the fixture.

SUMMARY

A toilet configuration is disclosed. The toilet includes a toilet fixture, a detachable primary drain, and a detachable secondary drain. The primary and secondary drains can be assembled together or formed unitarily. The fixture includes a toilet bowl, a primary drain interface at a bottom of the bowl configured to permit liquid to flow from the toilet bowl into a detachable primary drain, and a secondary drain hole. The detachable primary drain fluidly is connected to the primary drain interface and is configured to be fluidly connected to a sewer pipe to discharge the liquid directly into the sewer pipe. A detachable secondary drain fluidly is connected to the secondary drain hole and is configured to be fluidly connected to the sewer pipe to discharge backed up fluid from the toilet fixture directly into the sewer pipe.

BRIEF DESCRIPTION OF THE DRAWINGS

One or more embodiments will now be described, by way of example, with reference to the accompanying drawings, in which:

FIG. 9 illustrates in detail water flowing through a supply water plenum, the water being supplied from a tank to a water jet flushing the fixture, the water being channeled past a secondary drain inlet hole by a diverting wall such that only a minor portion of the water flow enters the secondary drain inlet, in accordance with the present disclosure; and FIG. 10 illustrates in detail the supply water plenum of FIG. 9, with a back-up flow of water entering the plenum and entering the secondary drain inlet, in accordance with the present disclosure.

DETAILED DESCRIPTION

Figure 1:
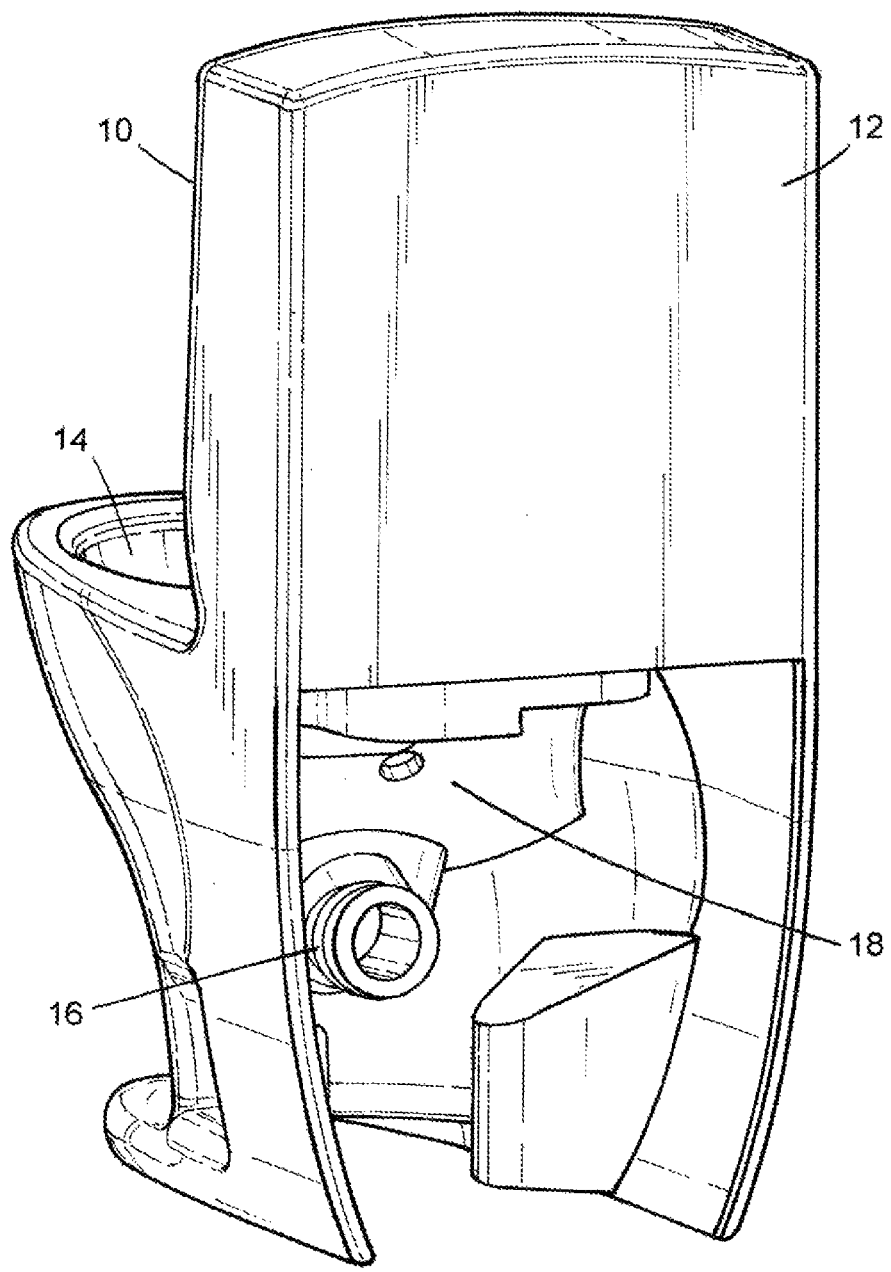
FIG. 1 illustrates an exemplary toilet fixture configured to receive a detachable primary drain and a detachable secondary drain, in accordance with the present disclosure.

Referring now to the drawings, wherein the showings are for the purpose of illustrating certain exemplary embodiments only and not for the purpose of limiting the same, an improved toilet is disclosed. A toilet can include a toilet fixture, a detachable primary drain, and a detachable secondary drain. One can create a toilet fixture, constructed of exemplary ceramic, including at least a toilet bowl and a primary drain interface. A detachable primary drain can be securely attached to the primary drain interface at one of the primary drain and at a sewer pipe or collar apparatus of a sewer pipe at the other end. The detachable primary drain includes a primary trap configured to seal sewer gases from exiting the sewer pipe and to create a siphon flushing action in the toilet. The toilet fixture can further include a secondary drain hole or secondary drain inlet. Such a hole or inlet can be connected to a secondary drain which connects the toilet fixture to the sewer pipe separately from the primary drain. Water in the toilet fixture, under certain conditions such a clog in the primary drain, can exit the fixture entirely separately from the primary drain.

The sewer pipe or the collar for the sewer pipe can be installed with the end of the sewer pipe or the collar thereof presenting a flat or substantially flat surface with the opening in a horizontal planar orientation for a toilet fixture to be installed thereto, with a wax ring typically being compressed between the fixture and sewer pipe. The primary drain includes an outlet which can extend past a top surface or an opening of the sewer pipe such that liquids leaving the primary drain empty directly into the sewer pipe. Similarly, the secondary drain includes an outlet which can extend past a top surface or opening of the sewer pipe. The primary drain outlet and secondary drain outlet can be entirely separate tubes extending into the sewer line. In another example, for example, when the primary drain and secondary drain are unitarily formed, the primary drain outlet and the secondary drain outlet each can empty separately into the sewer pipe, however with a dividing wall separating the primary drain outlet and the secondary drain outlet not necessarily extending past the entrance to the sewer pipe.

A secondary drain hole or secondary drain inlet can be formed in multiple or alternative locations within the toilet. Such a secondary drain hole or inlet should be above a normal full line for the toilet or the water level at which the water is intended to refill to after a flush. The secondary drain hole or inlet can be located within the toilet bowl, drawing water from the toilet bowl into the secondary drain and preventing the water from overflowing from the rim of the toilet. The secondary drain can alternatively be located to an internal passageway within the toilet which delivers water from a water tank or water supply line to the toilet bowl. Such an internal passageway can be termed a supply water plenum. The supply water plenum can, in normal operation, supply water from the water tank to holes located around the rim of the toilet bowl, to a water jet located at a bottom of the toilet bowl and configured to provide a flushing stream of water into the primary drain, or both. It will be appreciated that water backing up in a toilet bowl due to a clogged primary drain will additionally cause a water level to rise within the supply water plenum. A secondary drain inlet or hole located in the supply water plenum will remove water from the toilet fixture and prevent water from overflowing from the rim of the toilet.

FIG. 1 illustrates an exemplary toilet fixture configured to receive a detachable primary drain and a detachable secondary drain. The illustrated toilet fixture 10 can be constructed of exemplary ceramic. Fixture 10 includes a water tank 12 and a toilet bowl 14. Toilet bowl 14 connects at a lower portion to primary drain interface 16. Primary drain interface 16 can be a smooth cylindrical male-type fitting configured to accept a female-type fitting over the primary drain interface. In another embodiment, primary drain interface 16 can include annular ridges making retention of female-type fitting more effective. In other embodiments, primary drain interface 16 include a female-type fitting configured to interface with a male-type fitting connected to the detachable primary drain. The connection of the primary drain to the primary drain interface 16 must be secure and watertight and can include a band-clamp, adhesive or a bonding agent, or any other similar device or material configured to sealingly joint two pipe sections. Fixture 10 further includes a secondary drain hole 18 configured to permit water to flow out of the fixture separately from the primary drain interface. Secondary drain hole 18 can open to bowl 14 or an internal passage within the toilet such as a supply water plenum.

Figure 2:
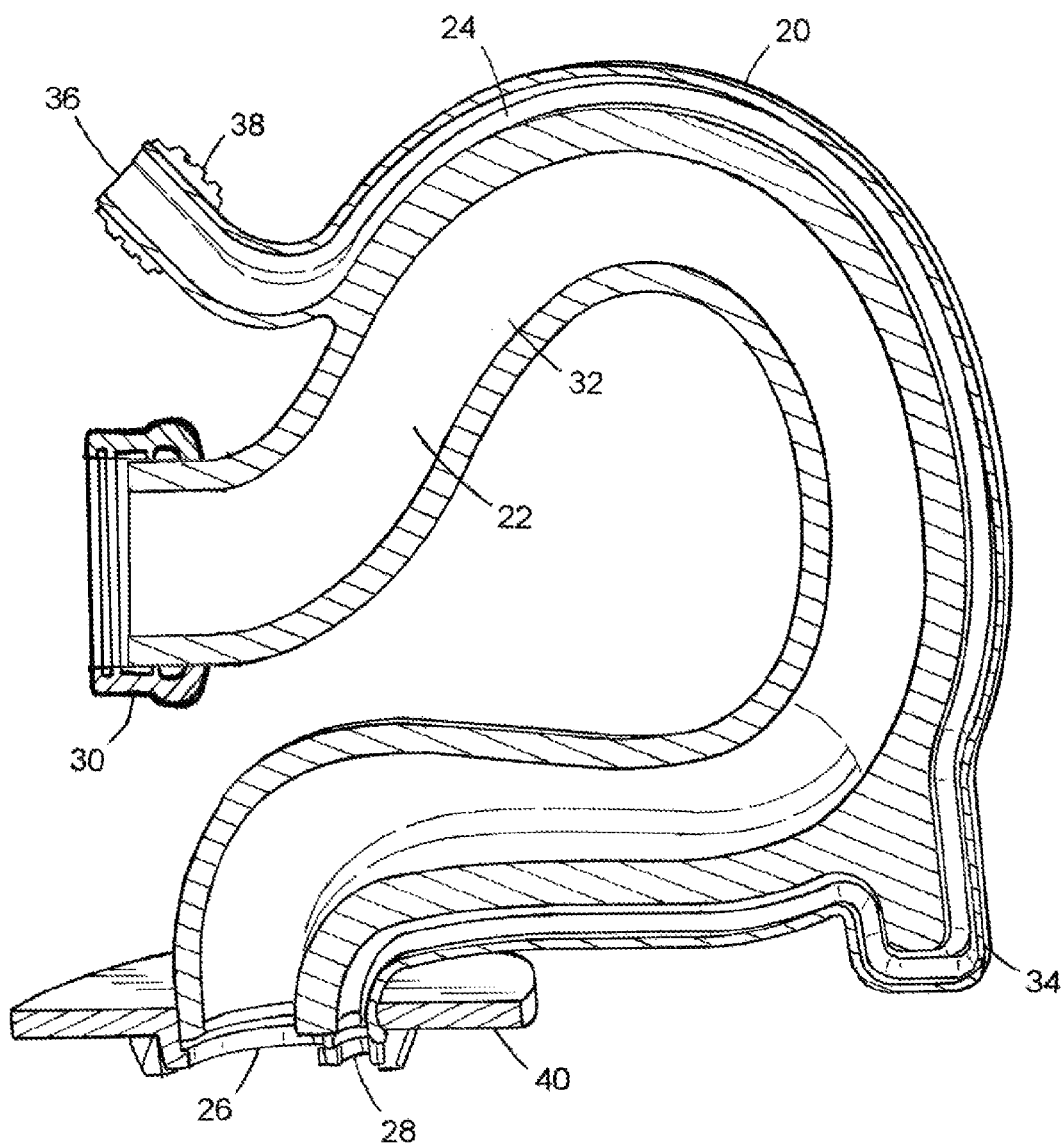
FIG. 2 illustrates an exemplary detachable primary and secondary drain assembly, in accordance with the present disclosure.

Primary drain interface 16 and secondary drain hole 18 can be connected to a separate primary drain tube and a separate secondary drain tube. In such an embodiment, the separate drain tubes can optionally be fixtured together along the tubes or near one or both ends of the tubes. In an alternative embodiment, FIG. 2 illustrates an exemplary detachable primary and secondary drain assembly wherein the primary drain tube and the secondary drain tube are connected together or formed unitarily as a single piece. Detachable primary and secondary drain assembly 20 is illustrated including primary drain tube 22 and secondary drain tube 24. Primary drain tube 22 includes female-type connector 30 configured to be sealingly secured to the primary drain interface 16 of FIG. 1. Primary drain tube 22 further includes trap portion 32 and primary drain outlet 26. Secondary drain tube 24 includes a secondary drain inlet 36 configured to be sealingly attached to secondary drain hole 18 of FIG. 1 and includes features 38 configured to aid in retention of the secondary drain tube 24 within the secondary drain hole 18. Further, adhesive or bonding agents known in the plumbing art can be used to seal and secure the connection and similarly any connections described herein. Secondary drain tube 24 further includes trap 34 and secondary drain outlet 28. Primary drain tube 22 and secondary drain tube 24 are connected along a substantial majority of their respective lengths. In one embodiment, two separate tubes can be adhered or bonded together. In another embodiment, two separate tubes can be bracketed or fastened together. In another embodiment, the two tubes can be molded as a single unitary piece through methods known in the art for plastics or polymer formation. In one embodiment, the unitary assembly can be molded in halves, providing half channels in each half as semi-circular depressions, with the halves coming together to form the circular tubes. The tubes can be made out of any material known for use in the plumbing arts for use on a sewer pipe. Primary drain outlet 26 and secondary drain outlet 28 are sealingly connected to a sewer pipe interface grommet 40 configured to be secured to an open sewer pipe. Grommet 40 serves a purpose of fixturing the primary and secondary drains to the sewer pipe and additionally to seal against the sewer pipe and prevent any leakage from sewer pipe.

Figure 3:
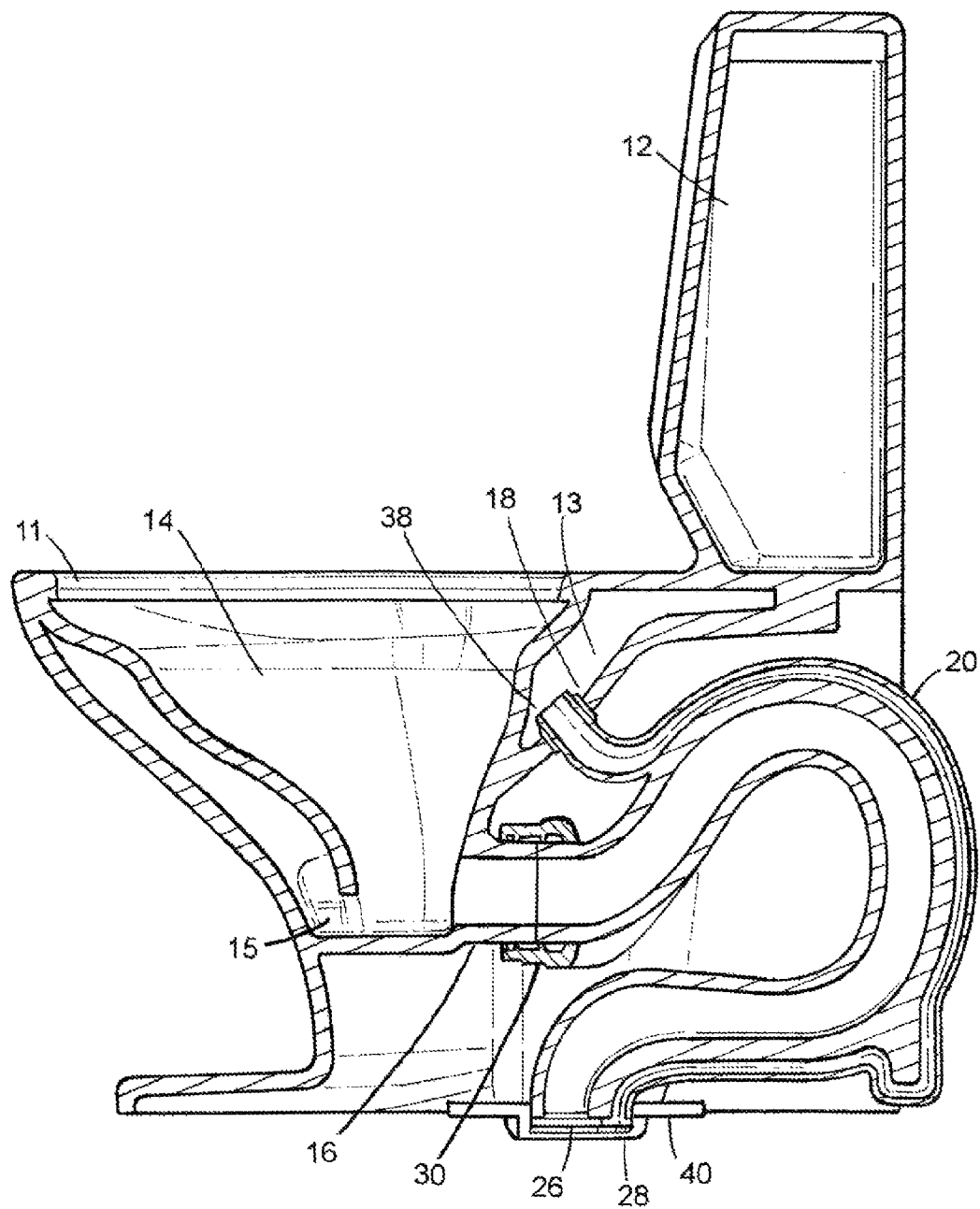
FIG. 3 illustrates the detachable primary and secondary drain assembly of FIG. 2 attached to the toilet fixture of claim 1, in accordance with the present disclosure.

FIG. 3 illustrates in cross section the detachable primary and secondary drain assembly of FIG. 2 attached to the toilet fixture of claim 1. The illustrated toilet fixture includes a water tank 12, a toilet bowl 14, and a supply water plenum 13 providing a path for water to flow to holes around rim 11, to jet outlet 15, or both. Detachable primary and secondary drain assembly 20 is illustrated attached to primary drain interface 16 with female-type connector 30 and attached to secondary drain hole 18 with features 38. Primary drain outlet 26, secondary drain outlet 28, and grommet 40 are illustrated provided upon a bottom surface of the fixture corresponding to where the fixture will line up with a sewer pipe during and after installation.

Figure 4:
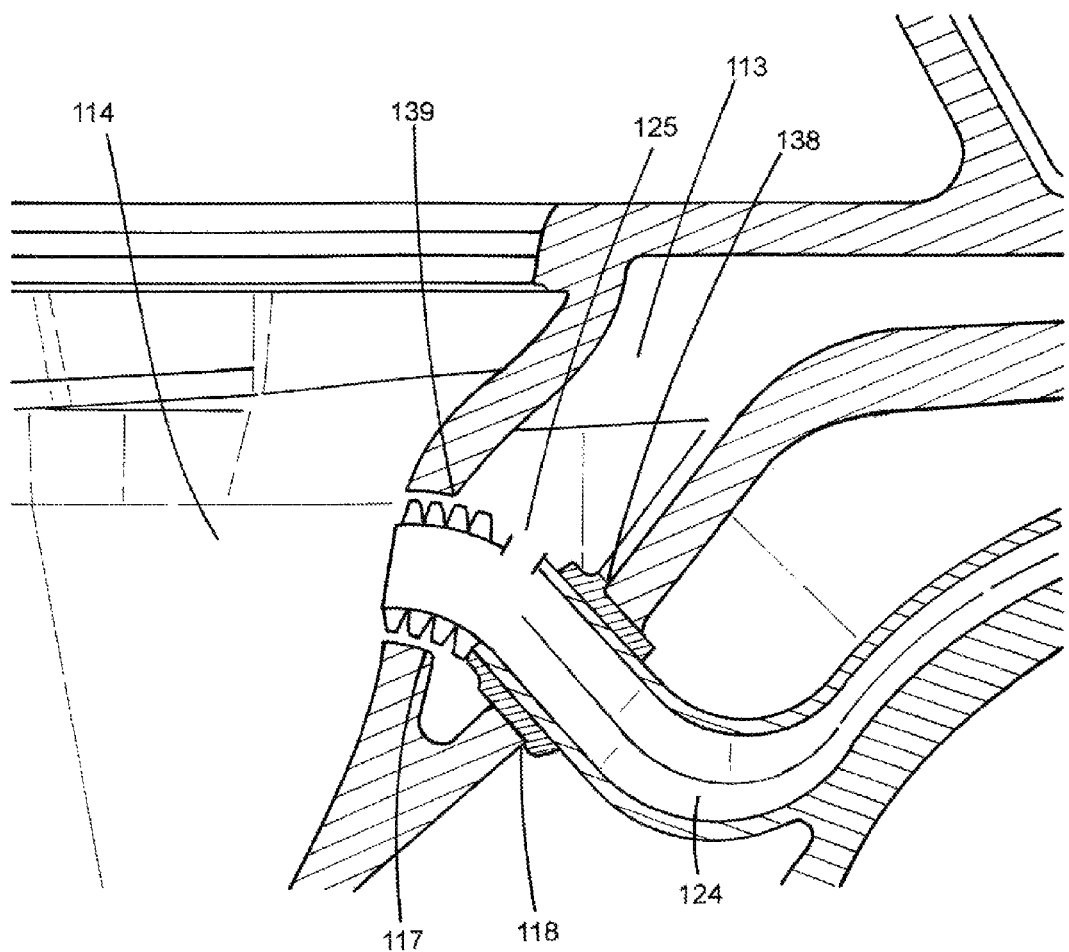
FIG. 4 illustrates an exemplary alternative embodiment of a toilet fixture and secondary drain connection, with the secondary drain connecting directly to the toilet bowl, in accordance with the present disclosure.

As illustrated in FIG. 3, a secondary drain can connect directly with a supply water plenum 13. In another embodiment, where the supply water plenum only connects directly to holes around the rim of the toilet, the secondary drain can connect directly with the bowl of the toilet. FIG. 4 illustrates an exemplary alternative embodiment of a toilet fixture and secondary drain connection, with the secondary drain connecting directly to the toilet bowl through the supply water plenum. The illustrated toilet fixture includes holes 118 and 117 formed in a wall of the supply water plenum 113 and a wall dividing the supply water plenum 113 and the toilet bowl 114, respectively. Secondary drain tube 124 is illustrated extending through hole 118, plenum 113, and hole 117 to present a secondary drain opening directly to the toilet bowl 114. Features 138 and 139 are formed on secondary drain tube 124 to aid in sealing with holes 118 and 117, respectively. Adhesive or a bonding agent can be used to seal the connections between the fixture and the secondary drain tube 124. A hole 125 can be located on a portion of secondary drain tube 124 that is between holes 117 and 118, permitting a small amount of flushing water to enter the secondary drain tube 124 to flush out the tube and to keep the trap filled with water and further to aid in draining backed up water from the supply water plenum 113. Hole 125 could be initially sealed or selectively sealed according to methods known in the art for optional use with toilet fixtures without supply water plenums extending downward along the side of the toilet bowl 114.

Figure 5:
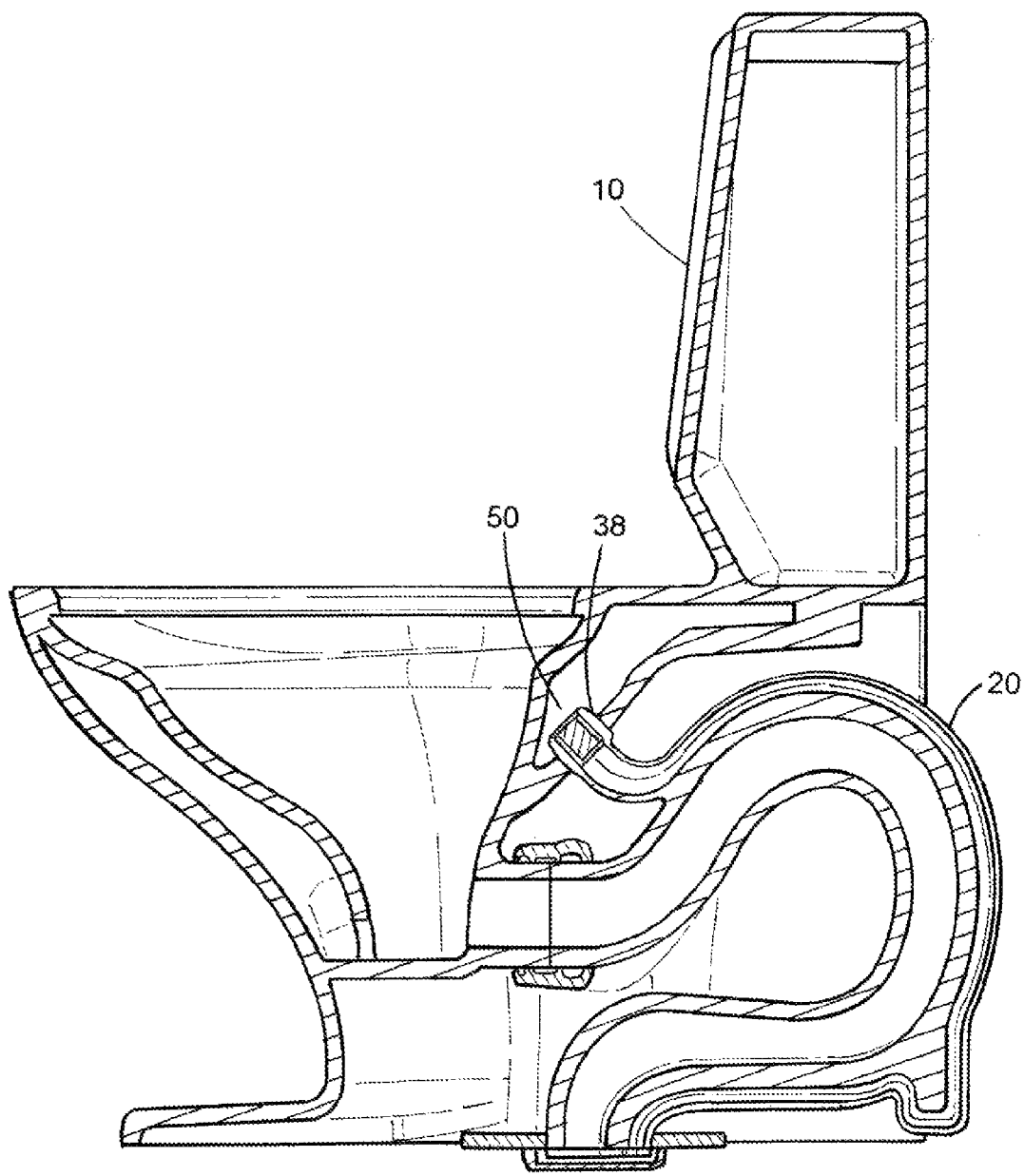
FIG. 5 illustrates an exemplary alternative embodiment of a detachable primary and secondary drain assembly, with a secondary drain connection being plugged, in accordance with the present disclosure.

FIG. 5 illustrates an exemplary alternative embodiment of a detachable primary and secondary drain assembly, with a secondary drain connection being plugged. Toilet fixture 10 is illustrated, with detachable primary and secondary drain assembly 20 attached thereto. A secondary drain including features 38 are installed and sealingly connected to fixture 10. An optional plug 50 is illustrated sealing the opening to the secondary drain. Through use of plug 50, the secondary drain can be an optional feature provided with the toilet, while still permitting all of the detachable primary and secondary drain assemblies 20 to be made with the same manufacturing tooling or process. Plug 50 can be added as a post process to manufacturing assembly 20.

Figure 6:
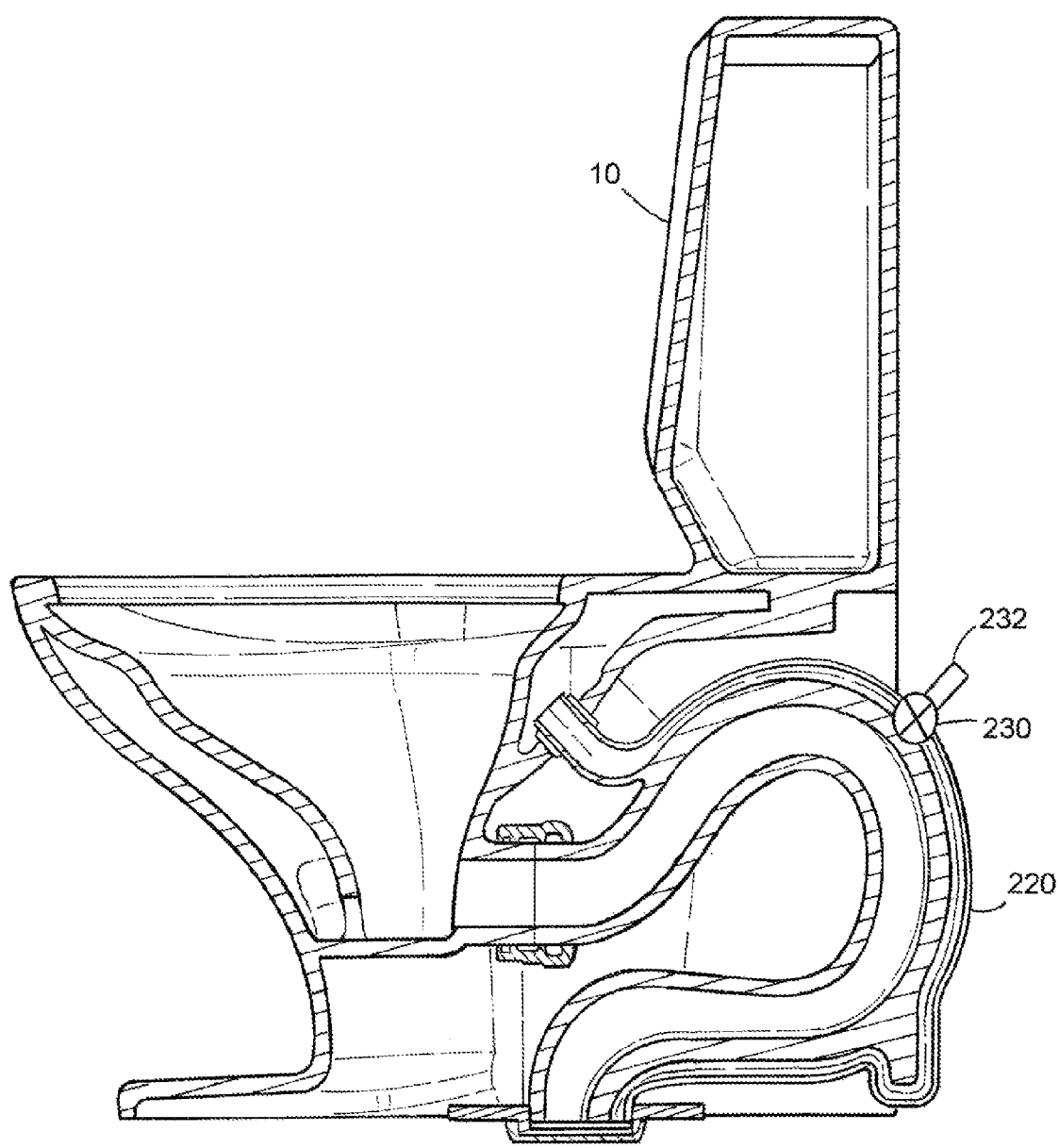
FIG. 6 illustrates an exemplary alternative embodiment of a detachable primary and secondary drain assembly including a valve configured to provide selective blockage of a secondary drain tube, in accordance with the present disclosure.

FIG. 6 illustrates an exemplary alternative embodiment of a detachable primary and secondary drain assembly including a valve configured to provide selective blockage of a secondary drain tube. Fixture 10 is illustrated, with detachable primary and secondary drain assembly 220 attached thereto. Under certain circumstances, for example to facilitate effective plunging of the toilet fixture, it can be advantageous to be able to stop flow through a secondary drain tube. Secondary drain valve 230 including a secondary drain handle 232 is illustrated upon the secondary drain tube. Valve 230 can operate as a ball valve or any other known valve type in the art. Under normal operation, drain handle 232 can be oriented to permit normal flow through the secondary drain. When flow through the secondary drain is undesirable, the user can turn drain handle 232 to a closed position, thereby preventing flow through the secondary drain.

Figure 8:
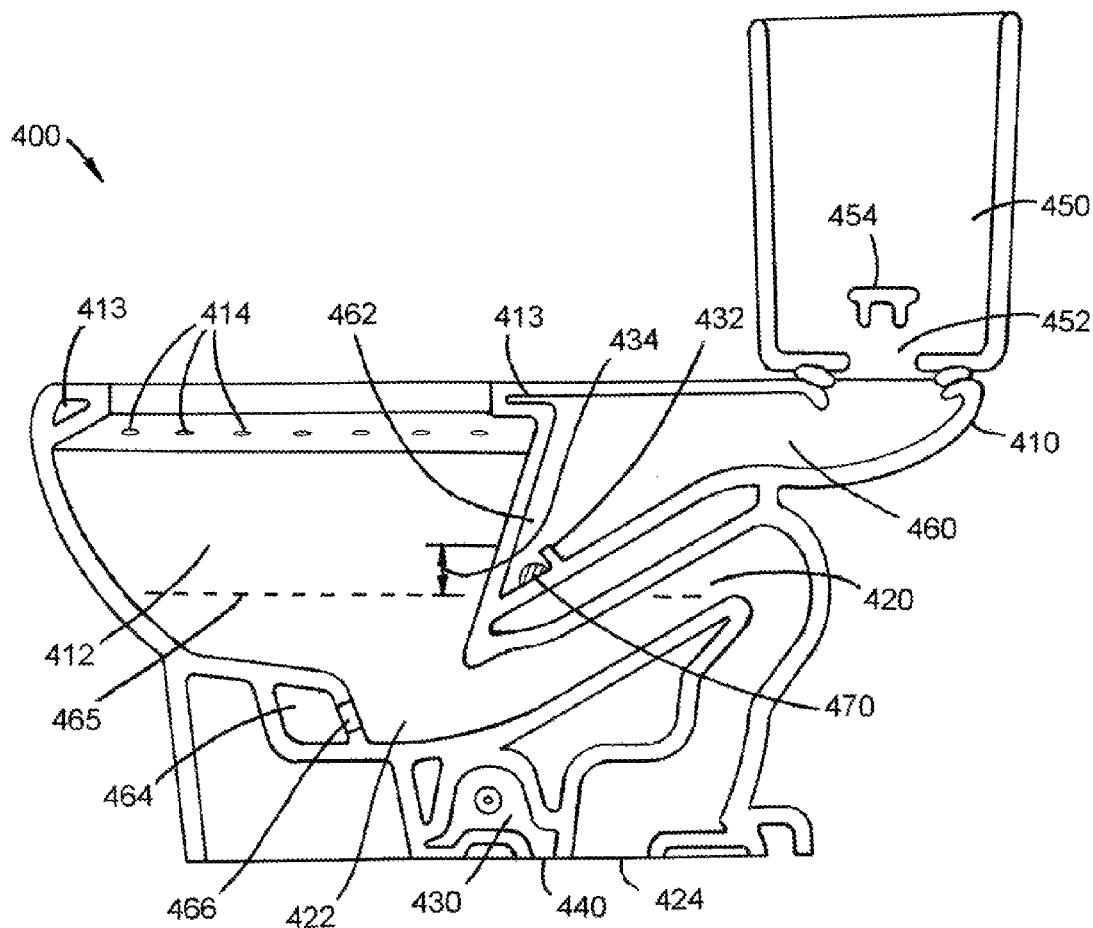
FIG. 8 illustrates an exemplary toilet fixture including a one-piece ceramic fixture including a secondary drain inlet located within a supply water plenum, the supply water plenum including a diverting wall similar to the diverting wall of FIG. 7 configured to channel a portion of a flushing flow within a supply water plenum away from the secondary drain without preventing backed up water from entering the secondary drain, in accordance with the present disclosure.

FIG. 8 is a cross-sectional view of an exemplary anti-overflow fixture wherein a hole internal to a supply water plenum provides a secondary drain to a fixture. Configuration 400 is similar to the toilet fixtures disclosed herein including a detachable primary and secondary drain assembly except that the toilet bowl and the primary and secondary drains are formed unitarily of a single piece of ceramic. Configuration 400 includes fixture 410 with a water tank 450, a bowl 412, and a primary drain 420. Water is held in water tank 450 by tank valve 454. Once tank valve 454 is opened, water rushes according to the pull of gravity through tank hole 452 and enters supply water plenum 460 of fixture 410. In another embodiment, a flushometer-type valve can be used with a tank-less toilet, wherein depression of the valve causes a surge of water to enter supply water plenum 460. A wide variety of toilet designs are envisioned for use with the configurations disclosed herein, and the disclosure is not intended to be limited by the particular examples provided. Supply water plenum 460 receives the flow of water from tank 450 and channels the water flow to different destinations for the purpose of flushing the fixture, emptying contents of the bowl, and refilling the bowl after the flush. A portion of the water flow within supply water plenum 460 is channeled to a channel 413 circumventing the rim of bowl 412. Water within channel 413 flows through holes 414 and into bowl 412. A portion of the water flow within supply water plenum 460 is channeled through passage 462 which progresses around the bowl and fluidly connects with jet channel 464. Water exits jet channel 464 through water jet hole 466 to provide flushing action/head pressure to primary drain 420 at primary drain inlet 422. Water and waste from bowl 412 and water from jet channel 464 enter primary drain 420 and flush through the primary drain 420 as the column of water and waste create a siphon in accordance with operation of a fixture as is known in the art. The water and waste exit the fixture through primary drain outlet 424. Primary drain outlet 424 is coupled to a structure sewage pipe channeling the waste to other sewage pipes and subsequently out of the structure.

A secondary drain inlet 470 is illustrated within supply water plenum 460. One having skill in the art will appreciate that the primary drain 420 and bowl 412 are configured such that during normal operation, water fills in the bowl 412 until a corresponding water level 465 within primary drain 420 causes water filling fixture to overflow the bend in primary drain 420. In this way, a normal water level for the bowl 412 to achieve during a filling cycle of the fixture is set. Because a corresponding water level also fills within supply water plenum 460, it is noted that any secondary drain outlet 470 should be located above the bend in primary drain 420 such that water will not drain from the water supply plenum 460 through the secondary drain when the bowl is filled to a normal designed level. However, the secondary drain inlet 470 can be located within a low inlet range 434 above the water level 465 but less than some threshold distance from water level 465. In this way, as soon as the water level in the fixture goes above water level 465, water begins immediately to drain through the secondary drain. In this way, the secondary drain has an enhanced ability to keep the water from overflowing bowl 412. In one embodiment, the threshold distance above water level 465 can be one inch. In another embodiment, the threshold distance above water level 465 can be two inches. In another embodiment, the threshold distance above water level 465 can be three inches.

Further, secondary drain inlet 434 can be made larger than a secondary drain hole in a unit without a diverting wall. A normal secondary drain inlet must be kept small to avoid too much water flowing through supply water plenum from the tank to the water jet from being diverted to the secondary drain. The illustrated diverter structure 432 located above secondary drain inlet 470. Diverter structure 432 is illustrated as a wall. Such a wall can be perpendicular to the flow of the water through the plenum. Such a wall can alternatively be tilted or curved either upstream or downstream to the flowing water. In the alternative, the wall of the fixture can be indented in the area above inlet 470 to similarly divert flowing water away from inlet 470. However, no diverter structure is located downstream of inlet 470. As a result, water flowing into the supply water plenum 460 from the jet channel 464 can freely access and drain through inlet 470 into the secondary drain. In one embodiment, secondary drain inlet 470 can be at least ½ inch in diameter/½ inch wide. In another embodiment, secondary drain inlet 470 can be at least one inch in diameter/one inch wide. In one embodiment, secondary drain inlet 470 can be at least 1 and ½ inch in diameter 1 and ½ inch wide.

Secondary drain inlet 470 is fluidly connected to secondary drain channel 430. A channel can travel integrally within fixture 410 to connect the secondary drain inlet 470 and the secondary drain channel 430. A channel connecting the secondary drain inlet 470 and the secondary drain channel 430 can include a water trap according to plumbing methods known in the art. Water within secondary drain channel 430 can exit the fixture through secondary drain outlet 440. In another embodiment, secondary drain channel 430 can be configured to empty into the primary drain 420 just above primary drain outlet 424. Primary drain outlet 424 and secondary drain outlet 440 can be configured to connect to a standard plumbing connection known in the art. In such an embodiment, secondary drain outlet 440 can be configured to extend through a collar region of the fixture and discharge water directly into the standard plumbing connection. Water can be channeled from supply water plenum 460 into secondary drain inlet 470 for the purpose of flushing the secondary drain and cleaning it out.

If a clog in primary drain 420 prevents water and waste from exiting bowl 412, the water level in bowl 412 rises. One having skill in the art will appreciate that as the water level in bowl 412 rises, a water level within the supply water plenum 460 will also rise. As the water level within the plenum reaches and enters secondary drain inlet 470, flows to secondary drain channel 430, and flows out of secondary drain outlet 440. By flowing through the secondary drain, water from the supply water plenum 460 bypasses the clog in the primary drain 420 and prevents the fixture from overflowing out of the bowl.

One or more than one secondary drain inlet 470 can be used to channel water from the supply water plenum 460.

Secondary drain holes can be formed integrally with the wall during the process of constructing the fixture, for example, prior to the porcelain material being heated, or the secondary drain holes can be added to the walls of the fixture through a drilling process after the construction of the fixture.

The embodiment of FIG. 8 includes jet channel 464. Some toilet fixtures include a water jet channel and some do not. A secondary drain inlet within a supply water plenum can still work within a fixture wherein water only enters the bowl through holes around the rim. However, water from the rising level in the bowl will not enter the plenum until the water level exceeds the height of the holes around the rim. In such a exemplary configuration, larger holes around the rim and/or a portion of holes around the rim placed lower in the bowl could facilitate water flowing from a bowl back into the plenum before the water level gets too high in the bowl. In a fixture without a water jet channel, the improved configuration of the secondary drain inlet 470 would drain water from plenum 460 faster than would the configuration of FIG. 1.

FIG. 9 illustrates in detail water flowing through a supply water plenum as illustrated in FIG. 8, the water being supplied from a tank to a water jet flushing the fixture, the water being channeled past a secondary drain inlet hole such that only a minor portion of the water flow enters the secondary drain inlet hole. Supply water plenum 460 is illustrated including channel 413, jet channel 464, and water jet hole 466 supplying a water flow 480 to primary drain inlet 422. Diverter structure 432 is illustrated diverting water away from secondary drain inlet 470, permitting some water to enter inlet 470 but reducing the amount of water as compared to how much would flow into inlet 470 if diverter structure 432 were not in place.

FIG. 10 illustrates in detail the supply water plenum of FIG. 9, with a back-up flow of water entering the plenum and entering the secondary drain inlet hole. Supply water plenum 460 is illustrated including jet channel 464, and water jet hole 466 supplying a water flow 490 backing up from primary drain inlet 422 into jet channel 464. While diverter structure 432 is illustrated above secondary drain inlet 470, flow 490 is unaffected by diverter structure 432 and can drain freely into secondary drain inlet 470.

Figure 7:
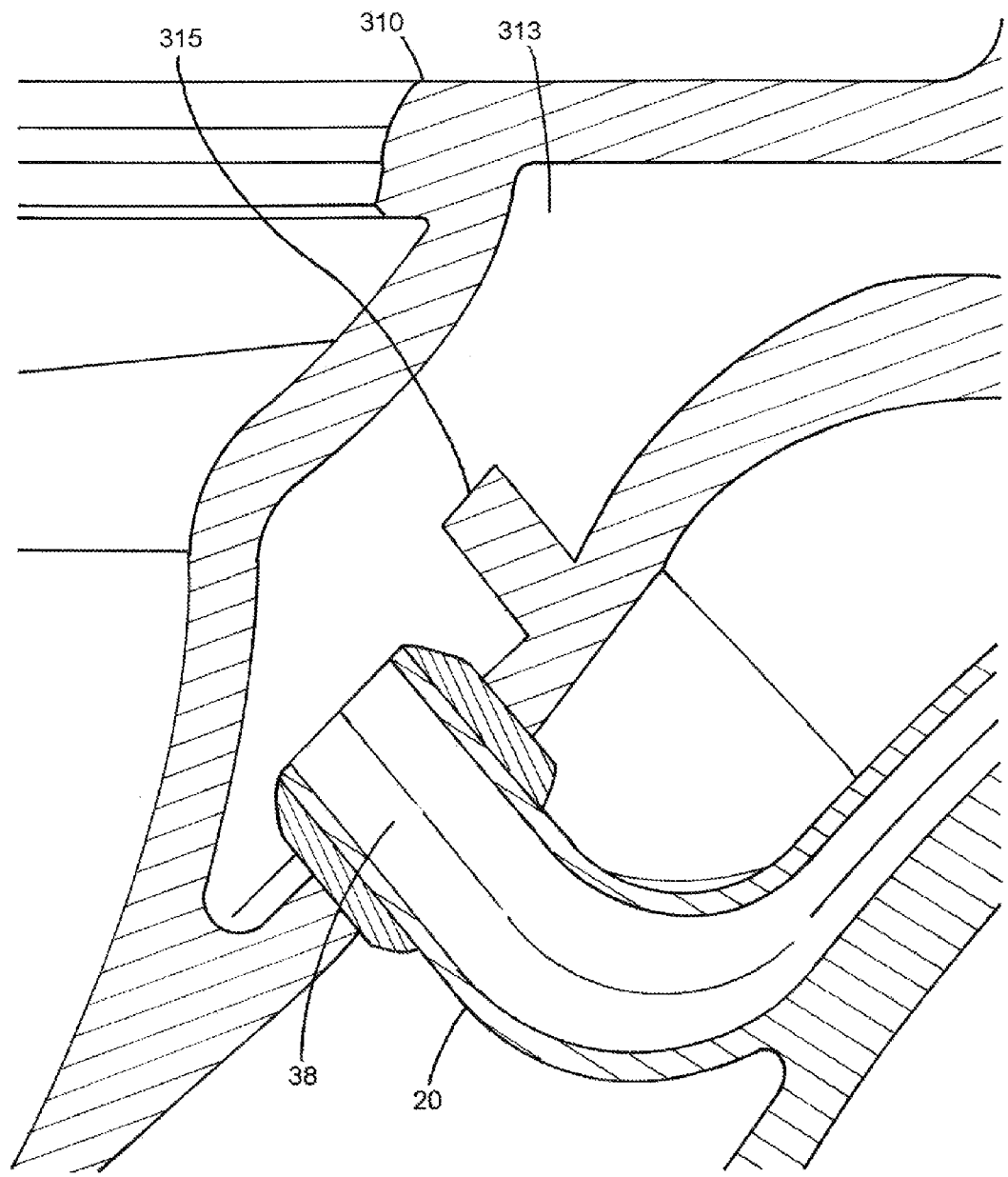
FIG. 7 illustrates an alternative embodiment of a toilet fixture configured to receive a detachable secondary drain, the fixture including a flow diverting wall configured to channel a portion of a flushing flow within a supply water plenum away from the secondary drain without preventing backed up water from entering the secondary drain, in accordance with the present disclosure.

FIG. 7 illustrates an alternative embodiment of a toilet fixture configured to receive a detachable secondary drain, the fixture including a flow diverting wall configured to channel a portion of a flushing flow within a supply water plenum away from the secondary drain without preventing backed up water from entering the secondary drain. Toilet fixture 310 includes a supply water plenum 313. Detachable primary and secondary drain assembly 20 is illustrated, with features 38 attached to a secondary drain hole in fixture 310. Within the supply water plenum 313, a diverter wall 315 can be used to divert a portion of water traveling from a water tank to the toilet bowl while not impeding backed up water within plenum 313 from entering the secondary drain.

In an alternative embodiment, the diverter wall can be formed as an elongated section on the end of the secondary drain tube extending into the toilet fixture. This elongated section, for example, can be a top arcuate portion of the tube (e.g. a half cylinder) extending through the secondary drain hole and into the plenum, preventing water flowing from above the secondary drain hole from entering the secondary drain tube.

Any of the embodiments disclosed herein can be configured such that the secondary drain entirely bypasses the primary drain and discharges past a collar of the fixture and directly into sewage pipes.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A toilet comprising:
a toilet fixture comprising:
  a toilet bowl;
  a primary drain interface at a bottom of the bowl configured to permit liquid to flow from the toilet bowl into a detachable primary drain; and
  a secondary drain hole;
the detachable primary drain fluidly connected to the primary drain interface and configured to be fluidly connected to a sewer pipe to discharge the liquid directly into the sewer pipe; and
a detachable secondary drain fluidly connected to the secondary drain hole and configured to be fluidly connected to the sewer pipe to discharge backed up fluid from the toilet fixture directly into the sewer pipe.

2. The toilet of claim 1, wherein the detachable primary drain and the detachable secondary drain are connected together.

3. The toilet of claim 1, wherein the detachable primary drain and the detachable secondary drain are formed as a unitary detachable primary and secondary drain assembly.

4. The toilet of claim 3, wherein the secondary drain hole is formed in a wall of supply water plenum within the toilet fixture, the supply water plenum channeling water from a water tank to the toilet bowl.

5. The toilet of claim 3, wherein the secondary drain hole is formed in a wall of the toilet bowl.

6. The toilet of claim 1, wherein the detachable secondary drain comprises a valve configured to selectively block flow through the detachable secondary drain.

7. The toilet of claim 1, wherein the toilet comprises a diverter wall within the toilet fixture configured to prevent a portion of water flowing from a water tank to the toilet bowl from entering the detachable secondary drain.

8. A toilet fixture, comprising:
   a toilet bowl;
   a primary drain interface at a bottom of the bowl configured to be connected to a detachable primary drain configured to permit liquid to flow from the toilet bowl into a sewer pipe; and
   a secondary drain hole formed in a wall of the toilet fixture and initially exposed to view from outside of the toilet fixture configured to be connected to a detachable secondary drain configured to permit liquid to flow from the toilet bowl into the sewer pipe separately from the primary drain.

9. The toilet fixture of claim 8, wherein the secondary drain hole is formed in a wall of a supply water plenum directing water from a water tank to the toilet bowl.

10. The toilet fixture of claim 9, further comprising an additional secondary drain hole formed in a wall of the toilet bowl.

11. The toilet fixture of claim 8, wherein the secondary drain hole is formed in a wall of the toilet bowl.

12. The toilet fixture of claim 8, wherein the primary drain interface comprises a male-type connector comprising annular features configured to retain the detachable primary drain.

13. The toilet fixture of claim 8, further comprising a diverter wall within the toilet fixture configured to prevent a portion of water flowing from a water tank to the toilet bowl from entering the detachable secondary drain.

14. A device configured to provide a primary drain and a secondary drain for attachment to a toilet fixture, the device comprising:
   a primary drain tube permitting fluid to drain from a bowl of a toilet fixture during normal operation, the primary drain tube comprising:
      a female-type connector configured to be attached to a tubular primary drain interface extending from the toilet fixture; and
      a primary drain outlet configured to connect with a sewer pipe;
   a secondary drain tube permitting backed up fluid to drain from the toilet fixture when the primary drain tube is clogged, the secondary drain comprising a secondary drain outlet configured to connect with the sewer pipe separately from the primary drain outlet;
   wherein the primary drain tube and the secondary drain tube are formed unitarily as a detachable primary and secondary drain assembly.

15. A device configured to provide a primary drain and a secondary drain for attachment to a toilet fixture, the device comprising:
   a primary drain tube permitting fluid to drain from a bowl of a toilet fixture during normal operation, the primary drain tube comprising:
      a female-type connector configured configured to be attached to a tubular primary drain interface extending from the toilet fixture; and
      a primary drain outlet configured to connect with a sewer pipe;
   a secondary drain tube permitting backed up fluid to drain from the toilet fixture when the primary drain tube is clogged, the secondary drain comprising a secondary drain outlet configured to connect with the sewer pipe separately from the primary drain outlet;
   wherein the primary drain outlet and the secondary drain outlet are connected to a grommet configured to interface with the sewer pipe.

* * * * *